United States Patent [19]

Kondo et al.

[11] Patent Number: 4,649,745
[45] Date of Patent: Mar. 17, 1987

[54] APPARATUS FOR MEASURING A FLOW RATE OF INTAKE AIR FOR AN ENGINE

[75] Inventors: Toshio Kondo; Akio Kobayashi, both of Kariya; Shunichiro Hiromasa, Okazaki; Akira Masuda, Aichi; Masahiko Miyaki, Oobu, all of Japan

[73] Assignee: Nippondenso Co., Ltd., Kariya, Japan

[21] Appl. No.: 671,615

[22] Filed: Nov. 15, 1984

[30] Foreign Application Priority Data

Nov. 16, 1983 [JP] Japan .................. 58-216939
May 15, 1984 [JP] Japan .................. 59-98298
May 23, 1984 [JP] Japan .................. 59-104930

[51] Int. Cl.⁴ .............................. G01F 1/68
[52] U.S. Cl. ...................... 73/204; 73/118.2
[58] Field of Search ........... 73/204, 118; 374/168, 374/173; 324/99 R, 106

[56] References Cited

U.S. PATENT DOCUMENTS

| | | | |
|---|---|---|---|
| 3,803,913 | 4/1974 | Tracer .................... | 73/204 |
| 3,928,800 | 12/1975 | Strenglein ................ | 324/99 R |
| 4,334,186 | 6/1982 | Sasayama et al. .......... | 73/204 |
| 4,357,830 | 11/1982 | Kohama et al. ............ | 73/204 |
| 4,409,828 | 10/1983 | Kohama et al. ............ | 73/204 |

FOREIGN PATENT DOCUMENTS 55-57112 4/1980 Japan .
56-24521 3/1981 Japan .

Primary Examiner—Herbert Goldstein
Attorney, Agent, or Firm—Cushman, Darby & Cushman

[57] ABSTRACT

An apparatus for measuring a flow of intake air to an engine includes a bridge circuit including a heat resistor placed in an intake air path of the engine, a resistor for sensing the temperature of the intake air, and a plurality of balance resistors. A heating current is supplied to this bridge circuit through a transistor controlled by a periodical current-passage control signal generated by a microcomputer. A signal Vh, representing a temperature change of the heat resistor heated by the heating current, is detected by the microcomputer. A first correction value is computed by using a difference between the detected value from the microcomputer and a signal Vho, representing temperature of the heat resistor when the bridge circuit is balanced at normal temperature. A time width correction value ΔDo1 is computed from a table on the basis of the first correction value. The correction signal ΔDo1 is used for correcting the current passage time. The current passage time width as corrected is used for computing a flow of the intake air.

15 Claims, 13 Drawing Figures

F I G. 4
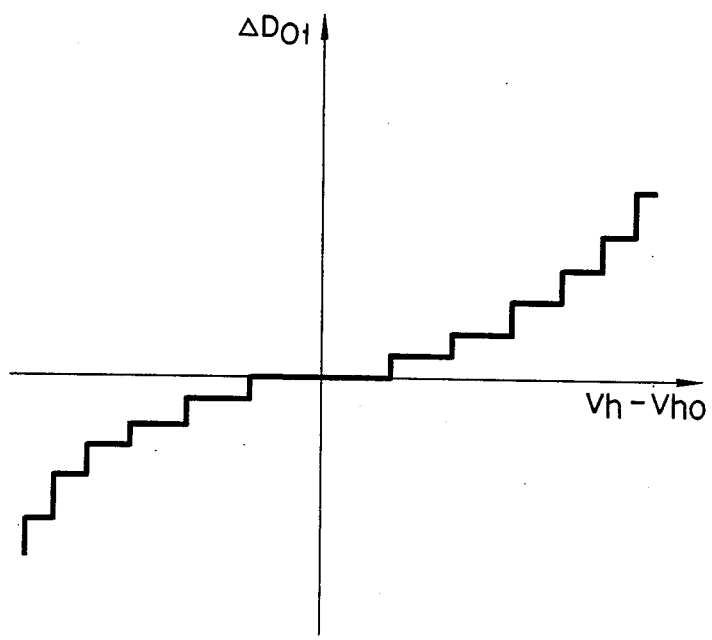
F I G. 5
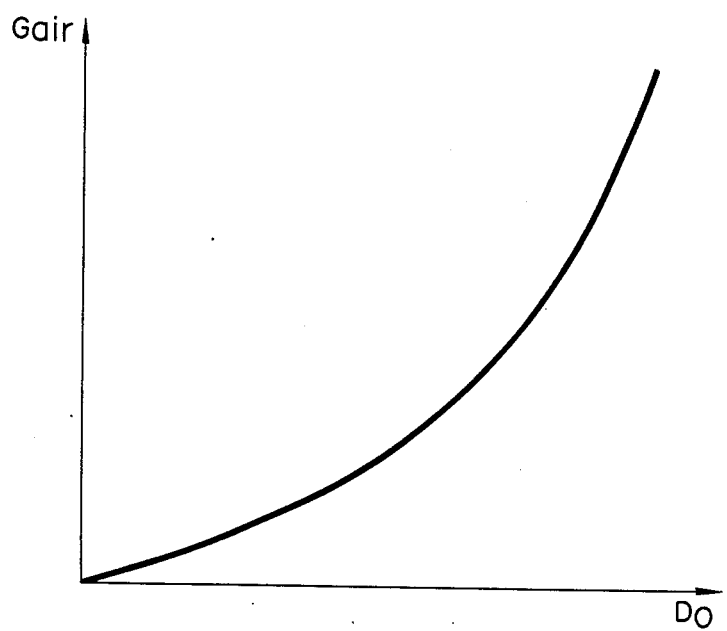

F I G. 10
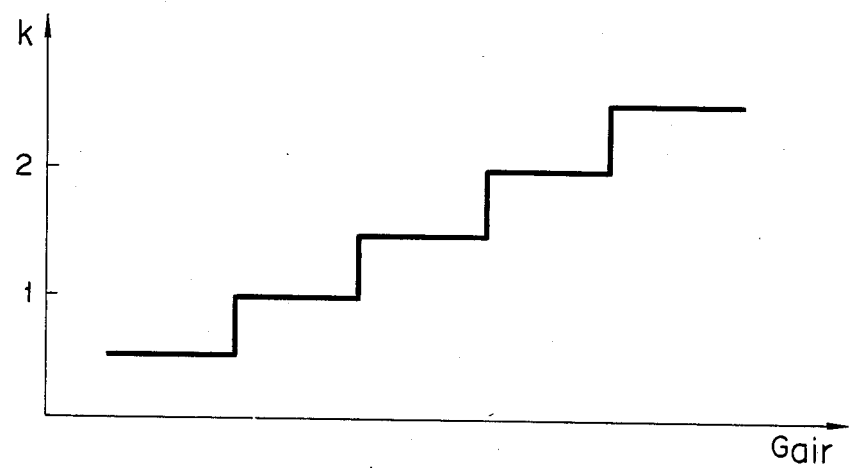

APPARATUS FOR MEASURING A FLOW RATE OF INTAKE AIR FOR AN ENGINE

BACKGROUND OF THE INVENTION

The present invention relates to an apparatus for measuring the flow of intake air to an engine. The apparatus is provided with a heater-type, air-flow sensing device containing a heat resistive element of which the radiation coefficient is dependent on an air flow in an intake pipe, and of which heating is controlled by current flowing therethrough. Further, the heat resistive element is designed for sensing the flow rate of intake air to an engine as one of the running conditions of the engine, as used for an electronic type engine control unit for controlling an injected amount of fuel through an arithmetic operation of a fuel injection amount.

An engine control unit using a microcomputer as a means for electronically controlling the engine has been known. In this type of the control unit, running conditions of the engine are always monitored, and the monitored data are fed as measured data to the engine control unit.

The means for sensing engine running conditions contains, for example, a sensor for sensing engine speed, a sensor for sensing the temperature of cooling water in the engine, a sensor for sensing the closing of a throttle, and a sensor for measuring an amount of intake air, which is directly related to the engine running conditions. The sensed signals by these sensors are transferred to the microcomputer. Then, the microcomputer calculates a fuel injection amount, an ignition timing, etc., on the basis of the sensed signal.

Many types of intake air flow sensors in use for collecting sensed data for the engine control have been known. Of these sensors, a heater-type, air-flow sensor, which senses a flow rate of intake air in terms of an electrical signal, is known.

An air flow measuring apparatus of the heater type is known and disclosed in Japanese Patent Publication No. 55-57112 (West Germany Patent Application Nos. P2845661.3 and P2911631.2). This apparatus contains a resistive element of which resistance depends on temperature in an intake pipe. Current is fed to the resistive element for controlling its heating. In this case, the resistive element is placed in the flow of air, and its radiation effect is selected corresponding to the air flow. Resistance of the resistive element of which the heating is thus controlled is selected according to its temperature. Temperature of the resistive element is monitored by monitoring its resistance. On the basis of the result of the monitoring, the heating current fed to the resistive element is controlled so that the temperature of the resistive element is kept constant.

Thus, in such an air flow measuring apparatus, the heating current value necessary for keeping the resistive element at a fixed temperature corresponds to an amount of air flow in the intake pipe. Accordingly, the air flow signal represents the heating current.

The measured output signal, derived from the heating-type, air-flow measuring apparatus, takes a signal form of nonlinear analog voltage.

In the engine control unit, it is required to control an injected amount of fuel in a broad range from 50–100 times, with a strict tolerance of several %. A measuring signal of the flow rate of intake air to the engine control unit executing such a control must be very high. Further, since the engine control unit is based on a microcomputer, the air flow measuring signal in the analog form is converted into a digital signal before it is supplied to the microcomputer. The high accuracy of the measuring signal requires a high accuracy A/D converter, as disclosed in Japanese Patent Publication No. 56-24521.

SUMMARY OF THE INVENTION

Accordingly, an object of the present invention is to provide a simply constructed apparatus for measuring a flow of intake air to an engine. The apparatus provides a measured air flow signal, readily available as digital data, and is effectively used for an engine control unit constructed with a microcomputer, and easily improves the measuring accuracy of the intake air flow.

Another object of the present invention is to provide the intake-air-flow measuring apparatus in which an air-flow measuring signal is produced in the form of a time-width signal, and an air flow, i.e., the time width, can digitally be read out with high accuracy by counting clock signals.

In the apparatus for measuring a flow of intake air to an engine according to the present invention, a heater resistor with resistance dependent on temperature is placed in an intake pipe of the engine. Heating current is periodically fed to the heat resistor. The temperature of the heat resistor, increasing corresponding to an air flow, is detected in terms of the resistance of the heat resistor. A time width of the heating current to the heat resistor is controlled by the detected value. A signal representing the time width of the heating current is produced as an air-flow measuring signal for transfer to the engine control unit.

In the air-flow measuring apparatus thus arranged, the width of the heating current fed to the heat resistor, by which heating is controlled, represents the flow of air through the intake pipe. The time width signal is counted by a digitally controlled means, for example, a counter, and is directly produced as a digital measuring signal. Therefore, there is no need for an A/D conversion of the measured signal. Thus, the measured signal is output in the signal form directly applicable to the microcomputer, thus guaranteeing a high measuring accuracy of the air flow. Additionally, there is no need for a complicated signal converting circuit, resulting in the simplicity of the circuit arrangement.

BRIEF DESCRIPTION OF THE DRAWINGS

FIG. 4 shows a state of a table for reading out a first correction value used in the flow of the above control;

FIG. 5 shows a relationship of air flow vs. measured output;

FIG. 10 shows a table for setting a correction count used in the fourth embodiment.

DETAILED DRESCRIPTION OF THE PREFERRED EMBODIMENTS

Figure 1:
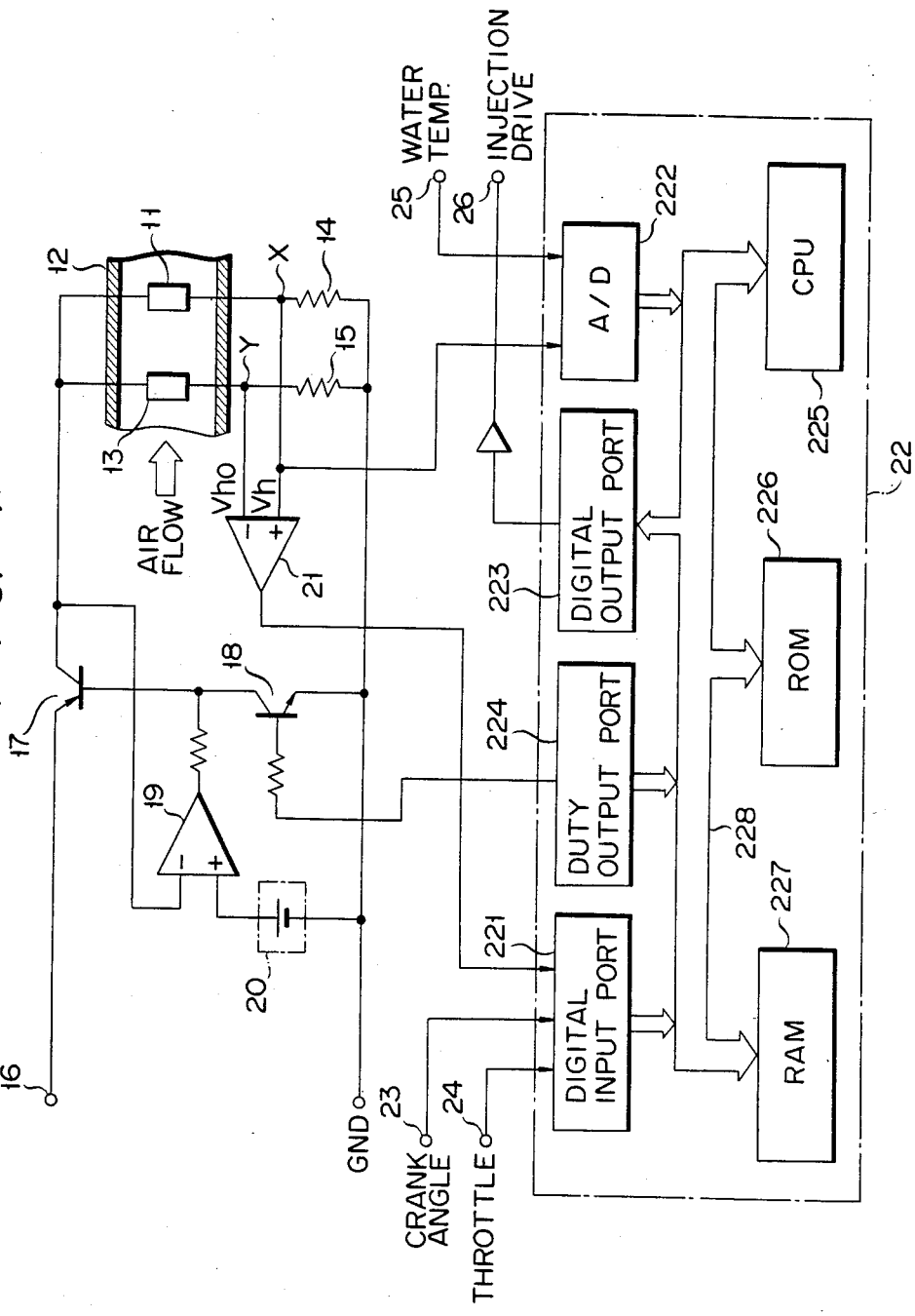
FIG. 1 shows a circuit arrangement illustrating a first embodiment of an apparatus, which is first embodiment of the present invention for measuring an intake air to an engine.

Reference is made to FIG. 1 illustrating a circuit useful in explaining a first embodiment of an apparatus for measuring a flow of intake air to an engine according to the present invention. In FIG. 1, a heat resistor 11 is placed in an intake pipe 12, provided in association with an engine (not shown), while being exposed to the air flow in the intake pipe 12. The heat resistor 11 is a wire made of resistive material of which resistance changes with temperature. Such a resistive material is platinum, for example. The intake pipe 12 further contains a temperature sensing resistor 13 made of a material like that of the heat resistor 11. Resistance of the temperature sensing resistor 13 changes with the temperature of air flowing through the intake pipe 12.

The heat resistor 11 and the temperature sensing resistor 13 are respectively connected in series to resistors 14 and 15. The resistors 11 and 13–15 make up a bridge circuit. A node X between the resistors 11 and 14 and a node Y between the resistors 13 and 15 serve as output terminals, respectively. A node between the resistors 11 and 13, which serves as an input terminal, is connected through a switching transistor 17 to a power source $V_B$ from a power terminal 16. A node between the resistors 14 and 15 is connected to a ground terminal GND.

The transistor 17 is turned on and off by a transistor 18 connected to the base circuit of the transistor 17. The transistor 17 is turned on when a voltage signal is applied to the base of the transistor 18, and supplies electric power to the bridge circuit. In this case, the voltage signal of the power supplied to the bridge circuit is detected by a differential amplifier 19 and is compared therein with a reference voltage as set by a reference power source 20. The output signal of the differential amplifier 19 is used for controlling the base voltage of the transistor 17. The power supplied to the bridge circuit is controlled to be constant at a value equal to the reference voltage.

The output signal from the sensor for the air flow measurement is taken out from the nodes X and Y as the output terminals of the bridge circuit. A sensed voltage signal Vh at the node X is supplied to the + input terminal of a comparator 21. The same signal is applied as a detected voltage signal to the microcomputer 22 forming an engine control unit. A voltage signal Vho derived from the point Y is supplied to the − terminal of the comparator 21.

A microcomputer 22 is provided with a digital input port 221 for receiving the digital input, an A/D converter 222 for converting an analog input signal into a digital signal, a digital output port 223, and a duty output port 224. The sensed voltage signal Vh from the point X is input to the A/D converter 222, and the output signal from the comparator 21 is supplied to the digital input port 221. A signal with a preset duty is produced from the duty output port 224 and supplied to the transistor 18, thereby to turn on and off the transistor 18.

Applied to the digital input port 221 is a crank angle signal and throttle closing signal from an engine section (not shown) through the input terminals 23 and 24. Applied to the A/D converter 222 is a cooling water signal through a terminal 25. The digital output port 223 provides a signal representing a fuel injection time width, for example. The signal is supplied as a drive signal of a magnetic fuel injection valve from an output terminal 26 to an injection drive circuit.

The microcomputer 22 contains a CPU 225, which is connected to a ROM 226, for storing program and data map through a bus line 228 and contains a RAM 227 as a temporary storage means.

Figure 2:
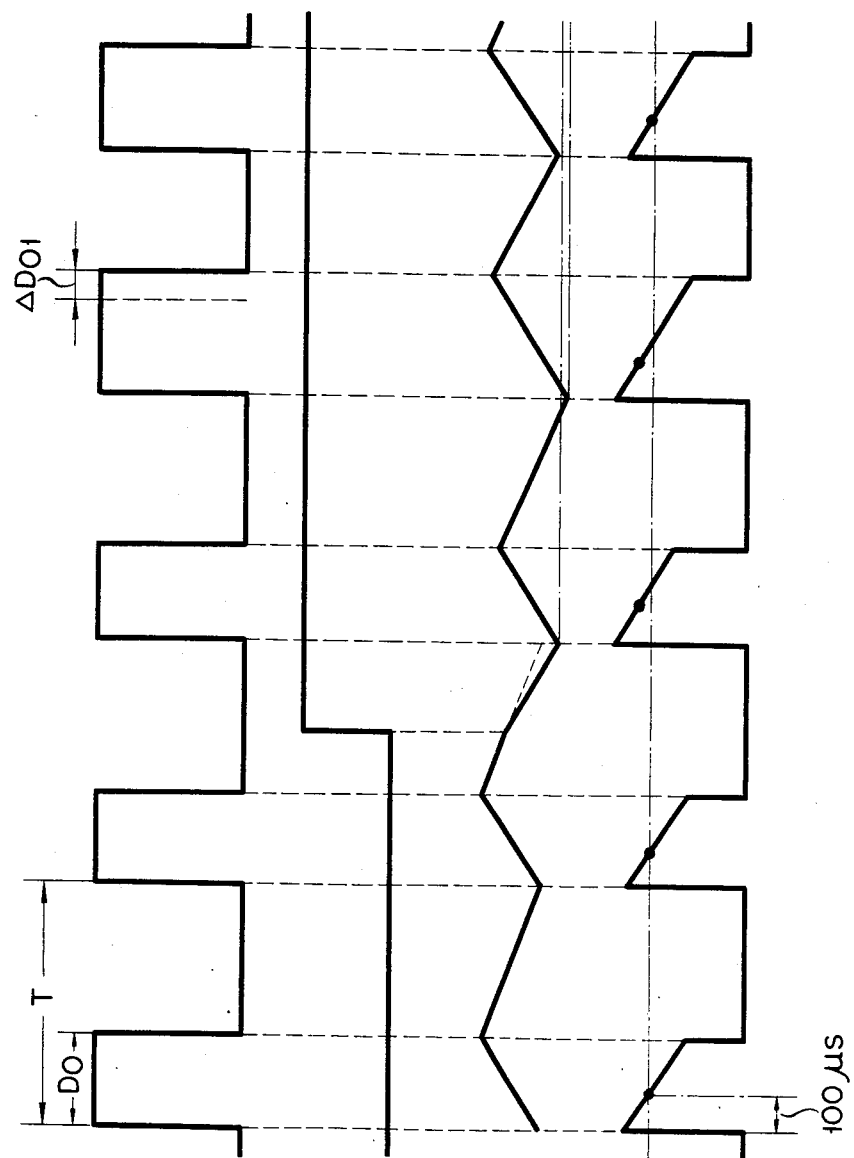
FIG. 2A–2D shows a time chart illustrating a state of a signal representing a flow of the above control.

In the air flow measuring apparatus thus arranged, when the engine is running, the duty output port 224 of the microcomputer 22 provides a signal rising at a specified period T (e.g. 4.096 ms). The output signal is a pulsative signal of a duty ratio, with a time width Do, as shown in FIG. 2A. This signal controls the transistor 18 and turns on the transistor 17 during the pulse width, thereby to supply electric power to the bridge circuit. Thus, the heating power is supplied to the heat resistor 11, thereby heating the resistor. In this case, the heat resistor 11 is exposed to the intake air flowing into the intake pipe 12. Then, the heat of the heat resistor 11 is radiated with relation to the air flow. FIG. 2B illustrates an assumed air flow having a step increase. Accordingly, a temperature rising rate, i.e., resistance, of the heater resistor 11 corresponds to the air flow, as shown in FIG. 2C. The rate of the falling temperature likewise corresponds to the air flow. That is to say, when an air flow changes, the resistance of the heat resistor 11 changes with the air flow change. Accordingly, the sensed voltage signal Vh at point X is sampled by the microcomputer 22 during the period Do of the current-passage control signal, as shown in FIG. 2A. The sampled signal takes a waveform as shown in FIG. 2D.

Figure 3:
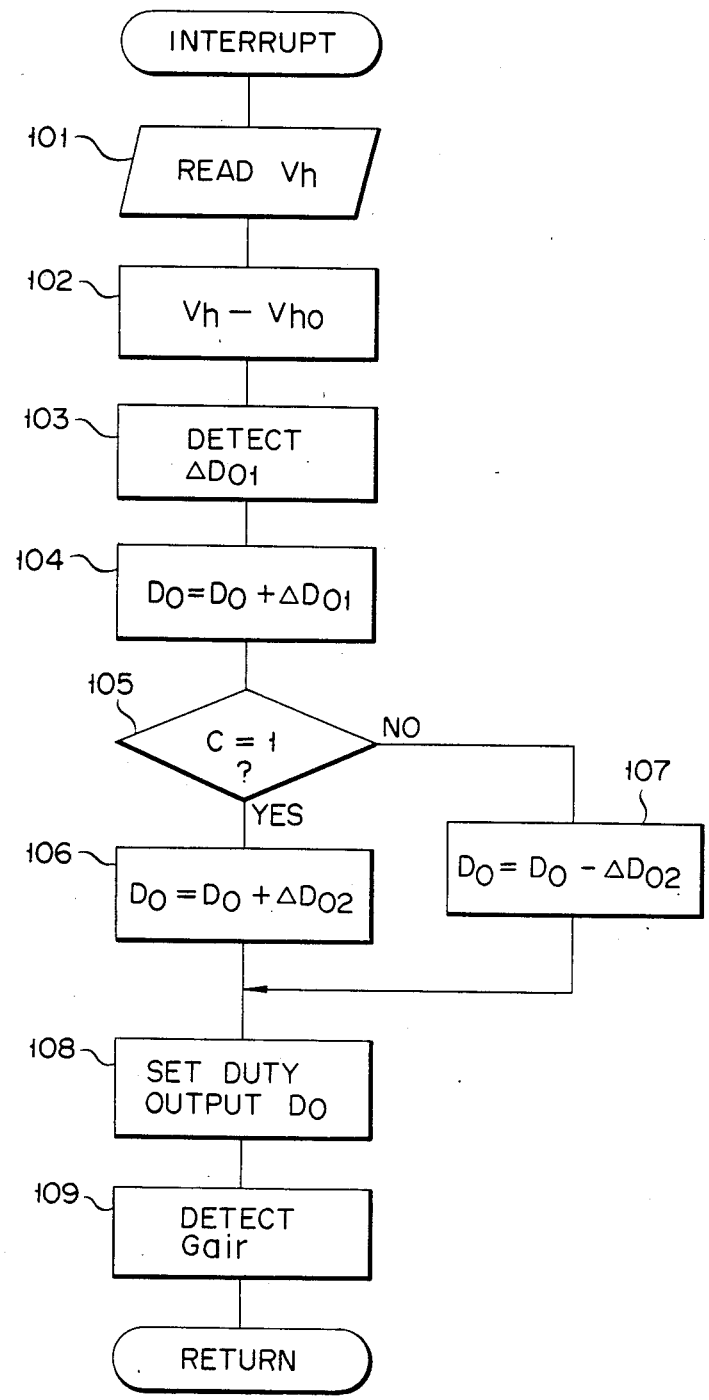
FIG. 3 shows a flow chart for illustrating an operating control state of the apparatus shown in FIG. 1.

Turning now to FIG. 3, there is shown a flow of the operation of the air flow measuring apparatus. An interrupt is executed at periods of 4.096 ms. In step 101, the sensed voltage signal Vh at point X is converted into a digital signal by the A/D converter 222, and then is fetched by the CPU 225. The fetching of the sensed voltage signal Vh is executed at a predetermined time t after the signal of the time width Do rises, for example, 100 μS after the rise of that signal. Then, the CPU 225 advances to the next step 102.

In step 102, a subtraction "Vh−Vho" is executed, where the voltage signal Vho is stored in the ROM 226 of the microcomputer 22, for example. The voltage signal Vho corresponds to a voltage value at point Y when the bridge circuit, including the heat resistor 11 and the temperature sensing resistor 13, is electrically balanced. Usually, the sensed voltage signal Vh, when a tolerance of each part is at an average value at ambient temperature 20° C., is detected and this value Vh is stored as the Vho.

The difference "Vh−Vho" corresponds to a difference between temperature of the intake air and temperature of the heat resistor 11. A first correction value ΔDo1 corresponding to this difference is read out from a table stored in the ROM 226, as shown in FIG. 4. In step 103, the correction value ΔDo1 is set. In step 104, "Do=Do+ΔDo1" is operated to thereby correct the current passage control signal Do fed to the heat resistor 11. The first correction value ΔDo1 differs with an amplitude and polarity, positive or negative, of the difference "Vh−Vho" of the bridge circuit, as seen from the above table.

In this case, when an air flow shown in FIG. 2B is not changed, "$\Delta Do1=0$" holds and the signal Do is substantially not corrected. When the air flow changes as shown in FIG. 2B, the resistance of the heat resistor 11 changes with a variation of a radiation effect due to an air flow change. More specifically, a decreasing rate of the resistance of the heat resistor 11, which is now not heated, increases with increase of the air flow. Accordingly, the value "$Vh-Vho=\Delta Do1$" as set in step 103 is increased, as shown in FIG. 2D. With this $\Delta Do1$, the first correction is applied for the time width Do of the current passage control signal of FIG. 2A.

When the air flow increases, as shown in FIG. 2B, a decreasing temperature rate of the heat resistor 11 increases from the time point when the air flow increases, as shown in FIG. 2C. Accordingly, at the next rise of the heating current, the temperature of the heat resistor 11 is lower than that of the previous rise of the heating current (the air flow is small), and the heating of the heat resistor 11 starts from such a lower temperature state thereof.

Therefore, when the heating current now applied has the same time width as that of the previously applied heating current, a rising temperature of the heat resistor 11 is lower than that when the air flow is small, and the voltage Vh increases above the voltage Vho, as shown in FIG. 2D. Then, the first correction value $\Delta Do1$, corresponding to the increased amount of the voltage, is obtained.

After the current passage time width Do is corrected by $\Delta Do1$, the current passage time width increases so that the temperature of the heat resistor 11 will increase. Accordingly, the voltage Vh of FIG. 2D is small, and hence the correction value $\Delta Do1$ is gradually reduced. Finally, the time width of the heating current is controlled so that it corresponds to the air flow.

Step 105 is executed to check the state of the output signal C of the comparator 21, connected to the voltage signals derived from points X and Y. A logical state of the output signal C, logical "1" or logical "0", indicates in which direction the bridge circuit is electrically unbalanced. In this step 105, if "C=1", the second correction value $\Delta Do2$ as preset in step 106 is added to the time width Do corrected by the first correction value $\Delta Do1$. If "C=0", the CPU 225 advances to step 107 in the program execution. In this step, the second correction value $\Delta Do2$ is subtracted from the time width Do.

Thus, "$Do=Do+\Delta Do1\pm\Delta Do2$" is operated correspondingly to the fetched Vh to thereby set a new time width Do. The new time width Do is set in step 108. In the next step 109, an air mass flow Gair is obtained from the table as shown in FIG. 5. The signal Gair corresponding to the air flow is applied to the microcomputer 22. The microcomputer 22 appropriately operates the signal Gair and separately fetched signals of a crank angle, a throttle opening amount, cooling water temperature, and the like, and produces an appropriate amount of fuel injected into the engine. The calculated injection amount signal is taken out from the output terminal 26 and is used for controlling the valve opening time of the fuel injection valve (not shown) and the fuel injected.

In the embodiment as mentioned above, the time width is corrected using two correction values: the first correction value $\Delta Do1$ corresponding to the voltage Vh at point X, detected through the A/D converter 222, and the second correction value $\Delta Do2$ as set by the output signal of the comparator 21. When the A/D converter 222 for digitizing the voltage Vh has a high converting accuracy, the correction by the second correction value $\Delta Do2$ is omissible.

Also in the above-mentioned embodiment, the voltage Vho is previously stored, and the voltage Vh is constantly detected. The microcomputer 22 computes "$Vh-Vho$". In this case, it is desirable that the voltage Vho corresponds to the temperature of air flowing through the intake pipe 12. Such a desire is realized by a second embodiment of the present invention shown in FIG. 6.

Figure 6:
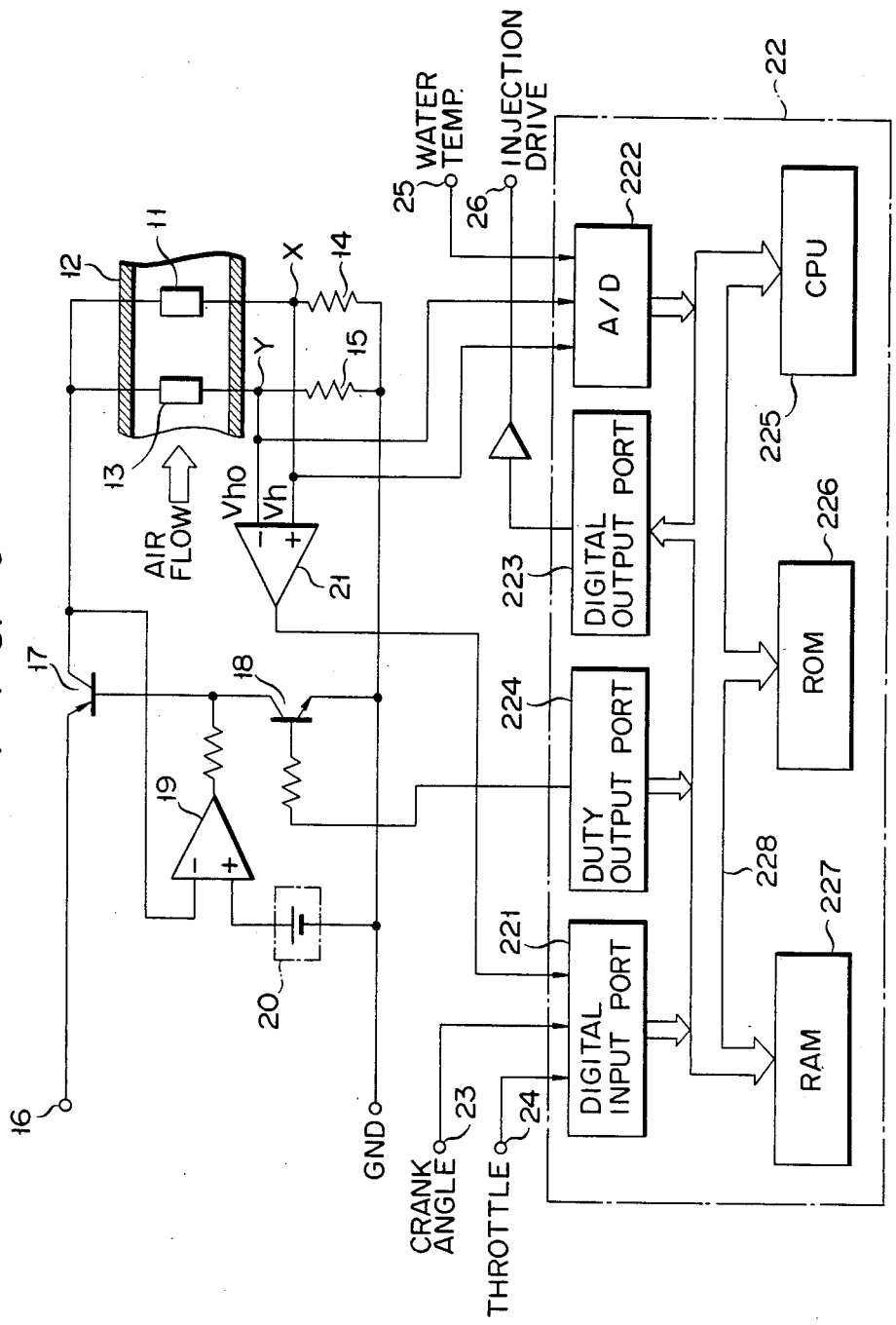
FIGS. 6 and 7 respectively show circuit arrangements of second and third embodiments of the present invention.

In FIG. 6, like numerals are used for simplicity to designating like or equivalent portions in FIG. 1. The voltage signal Vho at point X is supplied to the A/D converter 222 of the microcomputer 22. The digital data of the voltage signals Vh and Vho as fetched through the A/D converter 222 are operated according to the step 104 in the flow chart of FIG. 3.

With such an arrangement, an unbalance of the bridge circuit can be measured more accurately. Therefore, a range "$\Delta Do1=0$" in the table of FIG. 4 can further be narrowed. Accordingly, a response characteristic of the air flow measuring apparatus is further improved.

Figure 7:
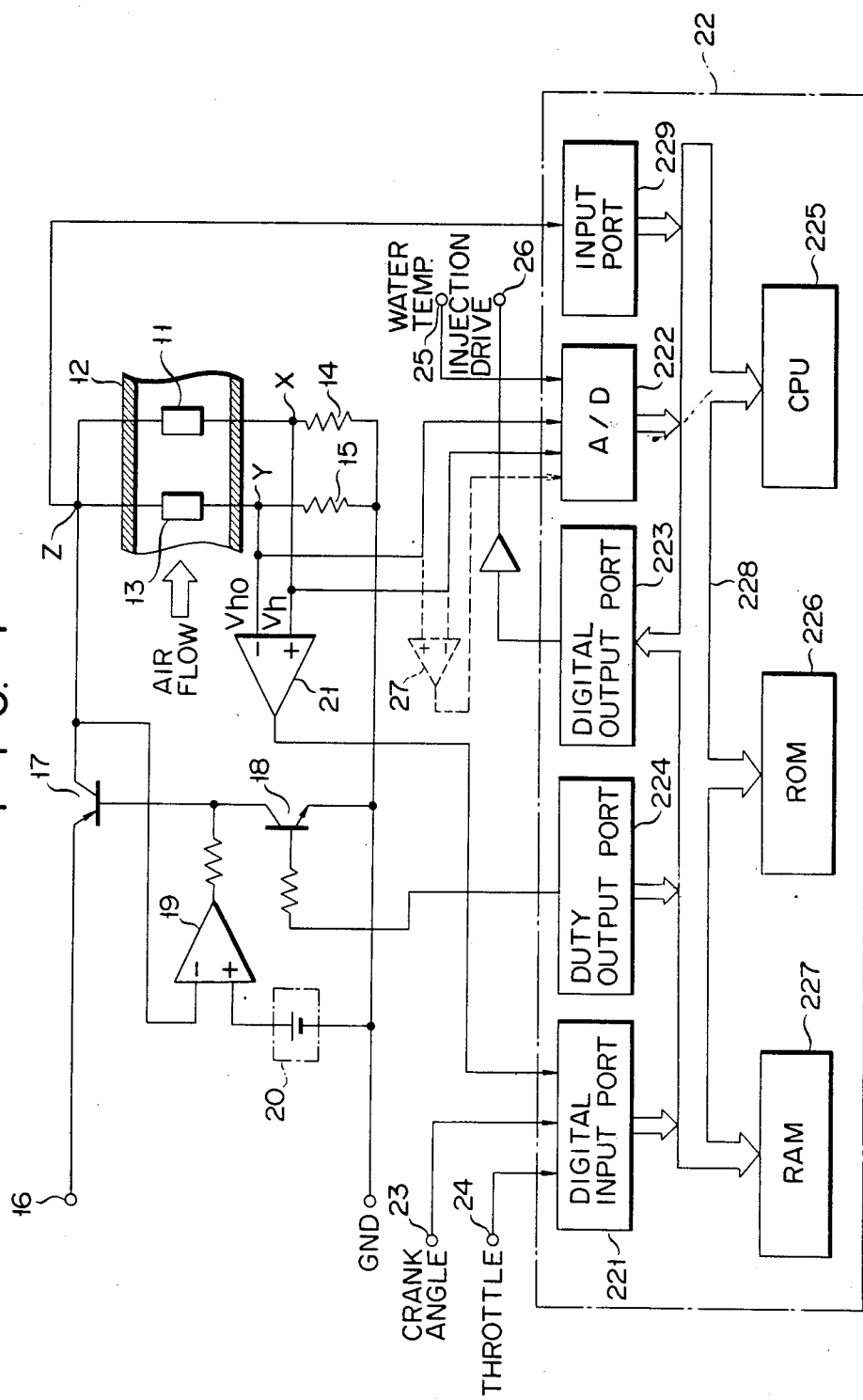

Turning now to FIG. 7, there is shown a third embodiment of an air-flow measuring apparatus according to the present invention. In this embodiment, the microcomputer 22 further includes a duty input port 229. A heating current signal, fed from the transistor 17 to the bridge circuit, is detected at point Z, and a time width signal Do for setting heating power actually supplied to the bridge circuit is applied to the duty input port 229. In FIG. 7, like reference numerals designate like or equivalent portions in FIG. 6.

Figure 8:
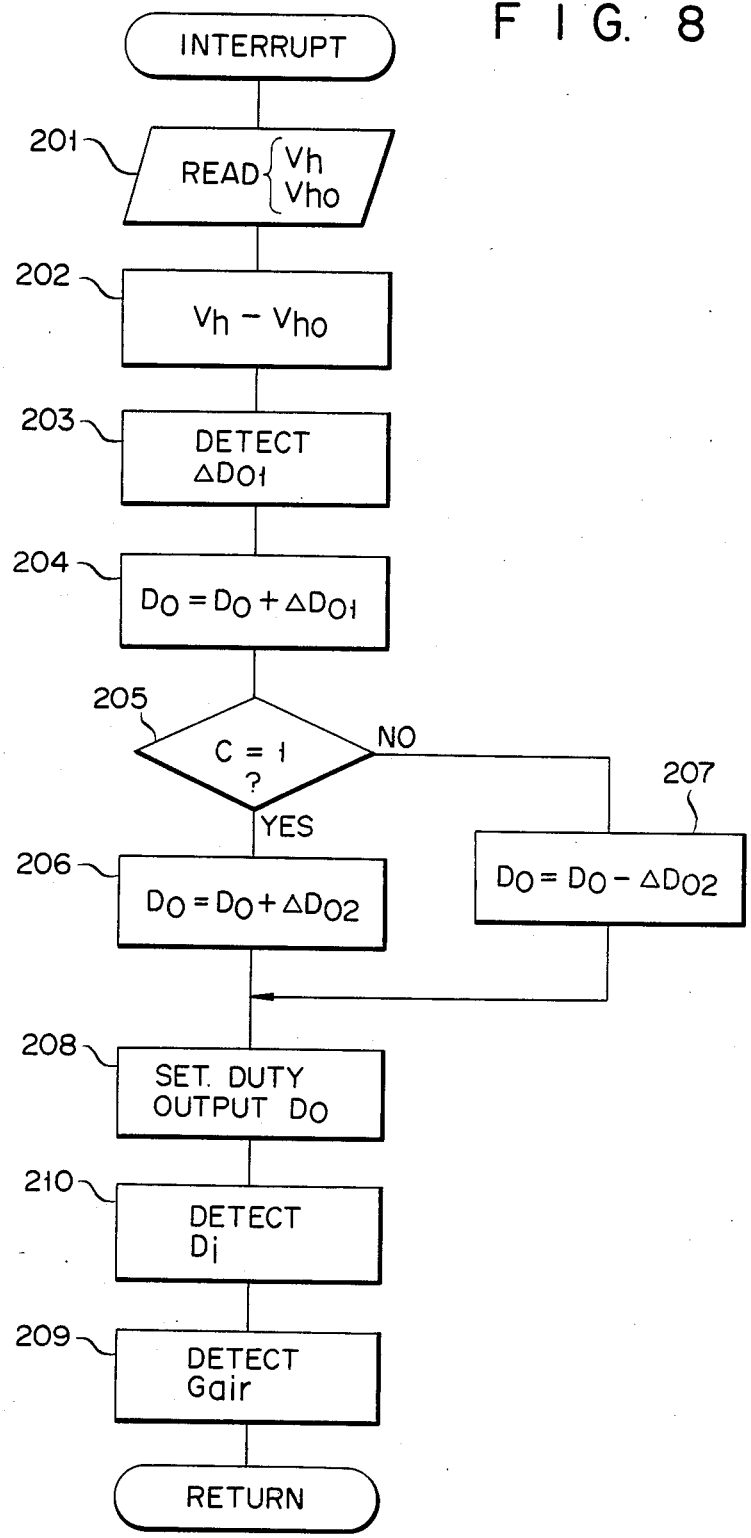
FIG. 8 shows a flow chart illustrating an operating control state of the third embodiment.

FIG. 8 flow charts the operation of the third embodiment. In step 201, the CPU 225 fetches the voltages Vh and Vho. In step 202, "$Vh-Vho$" is executed. In step 203, the first correction value $\Delta Do1$ read out from the table is set. In step 204, "$Do=Do+\Delta Do1$" is calculated. In step 205, the output signal of the comparator 21 is checked. Then, the CPU 225 advances to step 206 or 207 on the basis of the results of the check. According to the direction of the electrical unbalance of the bridge circuit, the correction by the second correction value $\Delta Do2$ is performed. Then, in step 208, a new time width Do for heating the heat resistor 11 is set up.

In the embodiments thus far mentioned, using the new time width Do, an air flow Gair is calculated in step 209, and is used for controlling the fuel injected amount. In this embodiment, in step 210, the time width Di of the heating power at point Z is detected. Using the actual time width Di, the intake air flow Gair is calculated for the fuel injected amount control.

In other words, this embodiment directly measures the time width of current passing to the bridge circuit. Because of this feature, if the parts constituting the air flow sensor have erroneous deviations in their performances, a measuring error of the air flow can effectively be reduced.

Figure 9:
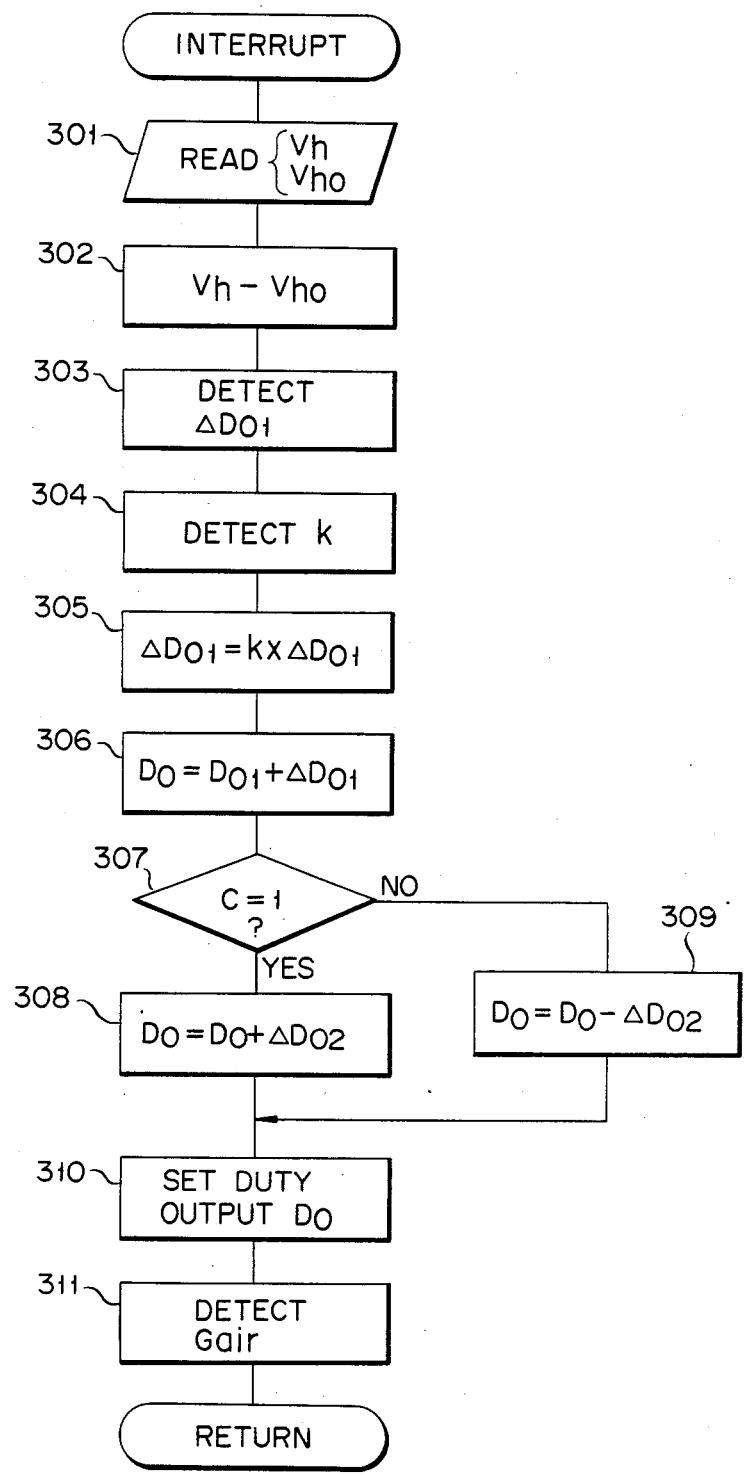
FIG. 9 shows a flow chart useful in explaining the operation of a fourth embodiment of the present invention.

FIG. 9 shows a flow chart for explaining a fourth embodiment of an air flow measuring apparatus according to the present invention. In step 302, "$Vh-Vho$" is executed, and in step 303, the first correction value $\Delta Do1$ is read out from the table as stored.

In step 304, a correction coefficient k is read out from the table stored in, for example, the ROM 226 of the microcomputer 22. The correction coefficient k is set up corresponding to the air flow Gair previously measured. The table has the correction coefficient k for the ordinate and the air flow Gair for the abscissa, as shown in FIG. 10. The correction coefficient k is for correcting the first correction value $\Delta Do1$. For this correction, as in step 305, the first correction value $\Delta Do1$ obtained from the table is multiplied by the correction coefficient k, thereby to providing a new correction value $\Delta Do1$.

In step 306, the new first correction value $\Delta Do1$ obtained in step 305 is added to the old time width Do to produce a new time width Do. In step 307, using the output signal C of the comparator 21, a check is performed to determine in which direction the bridge circuit is electrically unbalanced. In step 308 or 309, according to the direction of the electrical unbalance, the new second correction value $\Delta Do2$ is added to or subtracted from the time width Do. The time width as the result of the correction in step 308 or 309 is set in step 310. In step 311, an air flow Gair corresponding to the time width Do is read out from the table, and it is set as a measuring air flow signal.

The air flow signal Gair is used for computing an injection amount of fuel fed to an engine.

In the above-mentioned embodiment, the correction coefficient k is read out from the table corresponding to only the previous air flow Gair. The correct coefficient k may contain as another factor the running condition of the engine, more exactly, stationary or transient, in addition to the air flow Gair. This will be given in more detail.

(a) It is checked, using a cooling water signal, whether the warming-up of the engine is completed or not. Then, the running condition as checked is used as a factor of the correction factor k.

(b) Using a throttle opening signal and a crank angle signal, and under a condition that throttle valve is completely closed, it is checked whether the engine speed is below a predetermined value or not. Then, the result of the check is used as a factor of the correction coefficient k.

(c) A rate of change of the air flow signal Gair as measured is obtained. It is checked whether a positive change rate as obtained is above a predetermined value or not. It is checked whether a negative change rate as obtained is above a predetermined value or not. Further, it is checked whether or not such a value is equal to one of the values within a specific range near zero. On the results of the check as just mentioned, it is decided whether a present running mode of the engine is in the acceleration, deceleration or stop mode. The result of this decision is used for a factor of the correction coefficient k.

In the above-mentioned embodiment, the correction coefficient k is searched from the single table stored in the ROM of the microcomputer 22. A plurality of tables, not the single table, may respectively be provided for the running modes as decided by the factors.

In the flow chart shown in FIG. 9, the correction coefficient k is determined corresponding to the air flow Gair. Alternatively, the time width signal Do previously obtained, corresponding to the air flow Gair, may be used for determining the correction coefficient k.

In the embodiment as mentioned above, after the first correction value $\Delta Do1$ as the basic correction value is determined, it is multiplied by the correction coefficient k. Alternatively, a plurality of tables for the first correction values are prepared corresponding to the air flow Gair and the running condition of the engine. In searching the first correction value $\Delta Do1$, a predetermined table is selected according to the previous air flow Gair and the running condition of the engine. Then, the correction value $\Delta Do1$ is searched from the selected table. In this case, the correction value $\Delta Do1$ multiplied by the correction coefficient k is directly read out from the table.

In the above-mentioned embodiments, the voltages Vh and Vho at points X and Y are supplied to the A/D converter 222 of the microcomputer 22. The operation "Vh−Vho" is performed in the microcomputer 22. Alternatively, these voltage signals Vh and Vho are supplied to a differential amplifier 27, as indicated by dotted lines in FIG. 7. The differential amplifier 27 performs the operation "Vh−Vho" in an analog fashion. The results of the operation are supplied to the A/D converter 222 where it is digitized. The digital data thus obtained may be used for searching the first correction value $\Delta Do1$ from the table.

What is claimed is:

1. An apparatus for measuring a flow of intake air to an engine comprising:
   a bridge circuit including a heat resistor provided in an intake air path of the engine, a resistor for sensing the temperature of the intake air, and a plurality of balance resistors;
   current passage control means for feeding heating current with a specified time width at specified periods, thereby to heat said heat resistor;
   measured-signal detecting means for detecting a signal representing the temperature of said heat resistor from said bridge circuit;
   air temperature setting means for setting a signal representing the intake air temperature;
   correction signal computing means for computing a first correction value with a specified time width, using the signal representing said heat resistor temperature as detected by said measuring-signal detecting means and the signal representing the air temperature;
   current-passage, time-width setting means for computing a new time width set by said current-passage control means, using the time width representing said computed first correction value and the time width set by said current-passage control means; and
   air-flow computing means for computing a flow of said intake air according to said set current passage time width.

2. An apparatus according to claim 1, in which said measured-signal detecting means detects a signal representing the temperature of said heat resistor during a specified elapse of time, starting at the rise of the heating current which rises at periods as specified by said current-passage control means.

3. An apparatus according to claim 1, in which said air-temperature setting means is a storage means for storing a signal corresponding to the output signal of said bridge circuit which corresponds to said heat resistor.

4. An apparatus according to claim 1, in which said air-temperature setting means is a means for detecting an output signal from the output terminal corresponding to said temperature sensing resistor of said bridge circuit.

5. An apparatus according to claim 1, in which said correction-signal computing means is arranged so as to compute a correction-time width serving as said first correction value on the basis of the result of subtracting the value detected by said air-temperature setting means from a measured value detected by said measured signal detecting means.

6. An apparatus according to claim 1, in which said correction signal computing means is arranged so that the value detected by said air-temperature setting means is subtracted from the measured value detected by said measured-signal detecting means, and the first correction value is read out from a predetermined table on the basis of the subtraction.

7. An apparatus according to claim 1, in which said correction signal computing means includes a means which compares the output signals derived from the output terminals of said heat resistor of said bridge circuit and said temperature detecting resistor, and detects the direction of an electrical unbalance of said bridge circuit, and a second correction value as specified according to the direction of the unbalance is added to or subtracted from said first correction value, and said current-passage, time-width setting means is controlled by the correction signal as the result of said addition or subtraction of the second correction value.

8. An apparatus according to claim 1, in which said air-flow computing means produces an air flow signal on the basis of the time width as set by said current-passage, time-width setting means.

9. An apparatus according to claim 1, in which said air-flow computing means includes a means for detecting heating current fed to said bridge circuit to measure a time width as the duration of the heating current, and an air flow is detected on the basis of said measured time width.

10. An apparatus according to claim 1, in which said correction-signal computing means includes a means for computing said first correction value and a means for computing a correction coefficient corresponding to the previous air flow measured value, and said correction coefficient is multiplied by said first correction value.

11. An apparatus according to claim 10, in which said correction coefficient is set up by the previous air flow measured value and additionally a detected signal from a means for detecting a factor relating to a running condition of an engine.

12. An apparatus according to claim 11, in which said means for detecting the factor relating to the engine running condition is a means for discriminating a warming-up of the engine.

13. An apparatus according to claim 11, in which said means for detecting the factor of the engine running condition is a means for discriminating an idle running of the engine.

14. An apparatus according to claim 11, in which said means for detecting the factor of said engine running condition is a means for detecting the direction and an amplitude of a change of the air flow signal detected.

15. An apparatus for measuring a flow of intake air to an engine comprising:

a bridge circuit including a heat resistor provided in an intake air path of the engine, a resistor for sensing temperature of the intake air, and a plurality of balance resistors;

current-passage, time-control means for feeding heating current with a specified time width at specified intervals, thereby to heat said heat resistor;

processing means for: (1) comparing a pair of output signals produced by said bridge circuit indicative of voltages across said heat resistor and said sensing resistor, respectively, thereby to produce a difference signal representing an actual difference therebetween, (2) determining said specified time width by the actual difference between said bridge circuit voltages indicated by the difference signal obtained by said comparison, (3) computing a flow of said intake air from said specified time width; and an analog comparator, responsive to the analog voltage across said heat resistor and the analog voltage across said sensing resistor and providing an output signal indicative of which of said analog voltages is greater, said processing means also correcting said specified time width determined by said processing means by an incremental value in accordance with the output of said analog comparator.

* * * * *